(12) United States Patent
Bellamkonda et al.

(10) Patent No.: US 6,622,138 B1
(45) Date of Patent: Sep. 16, 2003

(54) METHOD AND APPARATUS FOR OPTIMIZING COMPUTATION OF OLAP RANKING FUNCTIONS

(75) Inventors: Srikanth Bellamkonda, Sunnyvale, CA (US); Bhaskar Ghosh, Burlingame, CA (US); Andrew Witkowski, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 249 days.

(21) Appl. No.: 09/656,304

(22) Filed: Sep. 6, 2000

(51) Int. Cl.[7] .............................. G06F 17/30
(52) U.S. Cl. ................................ 707/2
(58) Field of Search .................. 707/2, 3–6, 203, 707/100, 1; 706/47; 709/203

(56) References Cited

U.S. PATENT DOCUMENTS

| | | | |
|---|---|---|---|
| 5,897,632 A | 4/1999 | Dar et al. | |
| 5,956,706 A | 9/1999 | Carey et al. | |
| 6,112,198 A | * 8/2000 | Lohman et al. | ................. 707/3 |
| 6,125,360 A | 9/2000 | Witkowski et al. | |
| 6,134,543 A | 10/2000 | Witkowski et al. | |
| 6,199,063 B1 | 3/2001 | Colby et al. | |
| 6,338,056 B1 | * 1/2002 | Dessloch et al. | ........... 707/100 |
| 6,385,603 B1 | * 5/2002 | Chen et al. | ..................... 707/2 |

OTHER PUBLICATIONS

John Clear, Debbie Dunn,Brad Harvey,Michael Heytens, Peter Lohman,Abhay Mehta,Mark Melton,Lars Rohrberg, Ashok Savasere, Robert Wehrmeister, Melody Xu Titled "NonStop SQL/MX Primitives for Knowledge Discovery" Copyright ACM 1999 1–58113–143–7/99/08 p425–429.*

Red Brick Warehouse Manual Version 5.1 SQL Reference guide and SQL Self–study guide Copyrigth Red Brick System,Inc. copyright 1991–1998 Revision No. 1, Jan. 1998, Part No. 401551.*

(List continued on next page.)

*Primary Examiner*—Diane D. Mizrahi
(74) *Attorney, Agent, or Firm*—Christian A. Nicholes; Hickman Palermo Truong & Becker LLP

(57) ABSTRACT

Techniques are described for optimizing the computation of OLAP ranking functions. The techniques involve push-down of the filtering operation into the window sort operation corresponding to a target ranking function. The push-down technique may be employed when a predetermined set of push-down conditions are met.

26 Claims, 11 Drawing Sheets

OTHER PUBLICATIONS

John Clear, Debbie Dunn, Brad Harvey, Michael Heytens, Peter Lohman, Abhay Mehta, Mark Melton, Lars Rohrberg, Ashok Savasere, Robert Wehrmeister, Melody Xu Titled "NonStop SQL/MX Primitives for Knowledge Discovery" Copyright ACM 1999 1–58113–143–7/99/08 p425–429.*

Chaudhuri, Surajit et al., "Optimizing Queries with Materialized Views", Proceedings of the Eleventh International Conference on Data Engineering, Mar. 6–10, 1995, pp. 190–200.

Gopalkrishnan, Vivekanand et al., "Issues of Object–Relational View Design in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

Carey M. et al., "Reducing the Braking Distance of an SQL Query Engine", Proceedings of $24^{th}$ International Conference on Very Large Databases, Aug. 24–27, 1998, pp. 158–169.

Chaudhuri et al., "Evaluating Top k Selection Queries", Proceedings of $25^{th}$ International Conference on Very Large Databases, Sep. 7–10, 1999, pp. 399–410.

Carey et al, "On Saying "Enough Already!" in SQL", Proceedings of the ACM SIGMOND International conference on Management of data, 1997, pp. 219–230.

Koch et al., "Oracle 8, the Complete Reference", Osborne/Mc–Hill, 1997, pp. 415, 919–920.

* cited by examiner

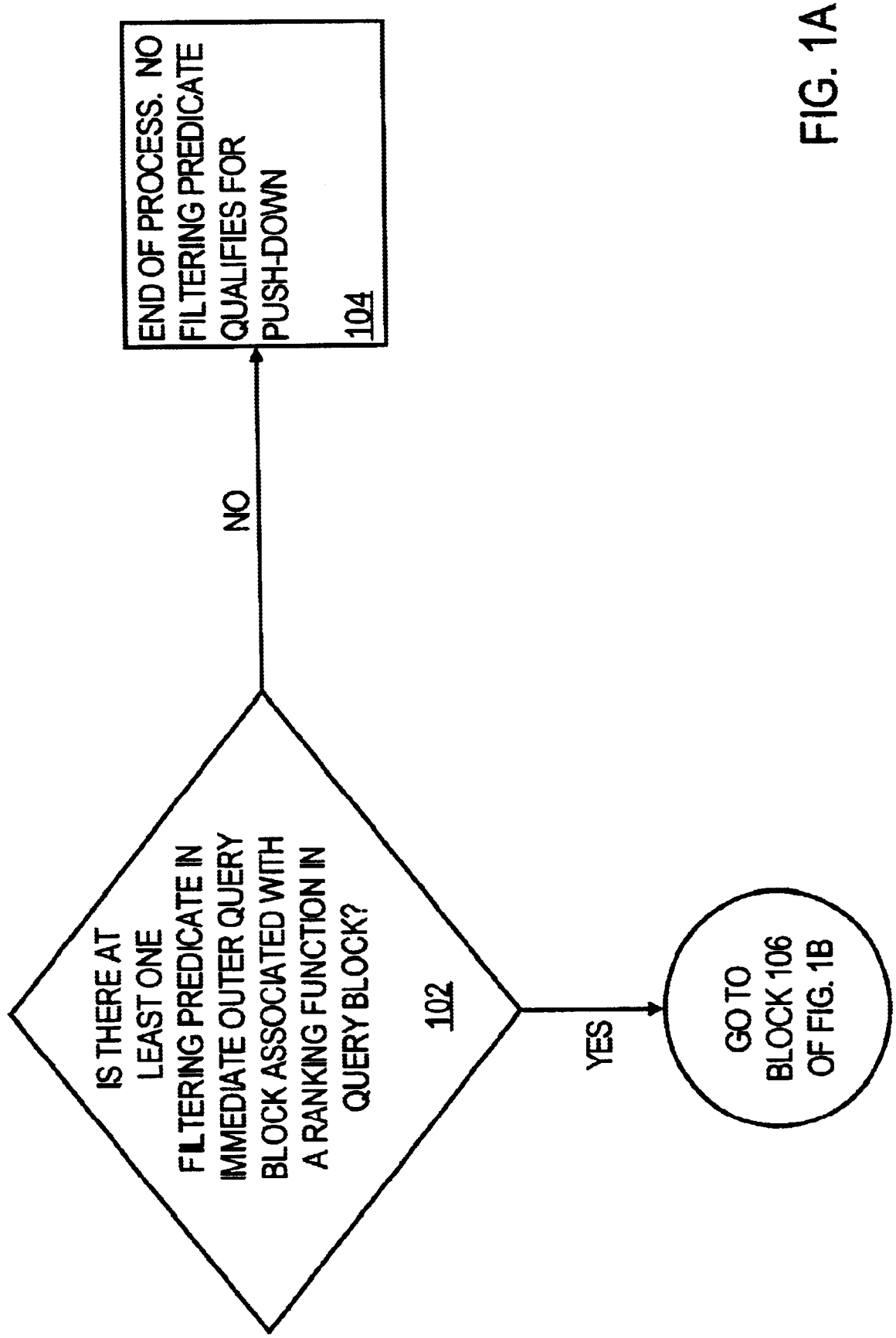

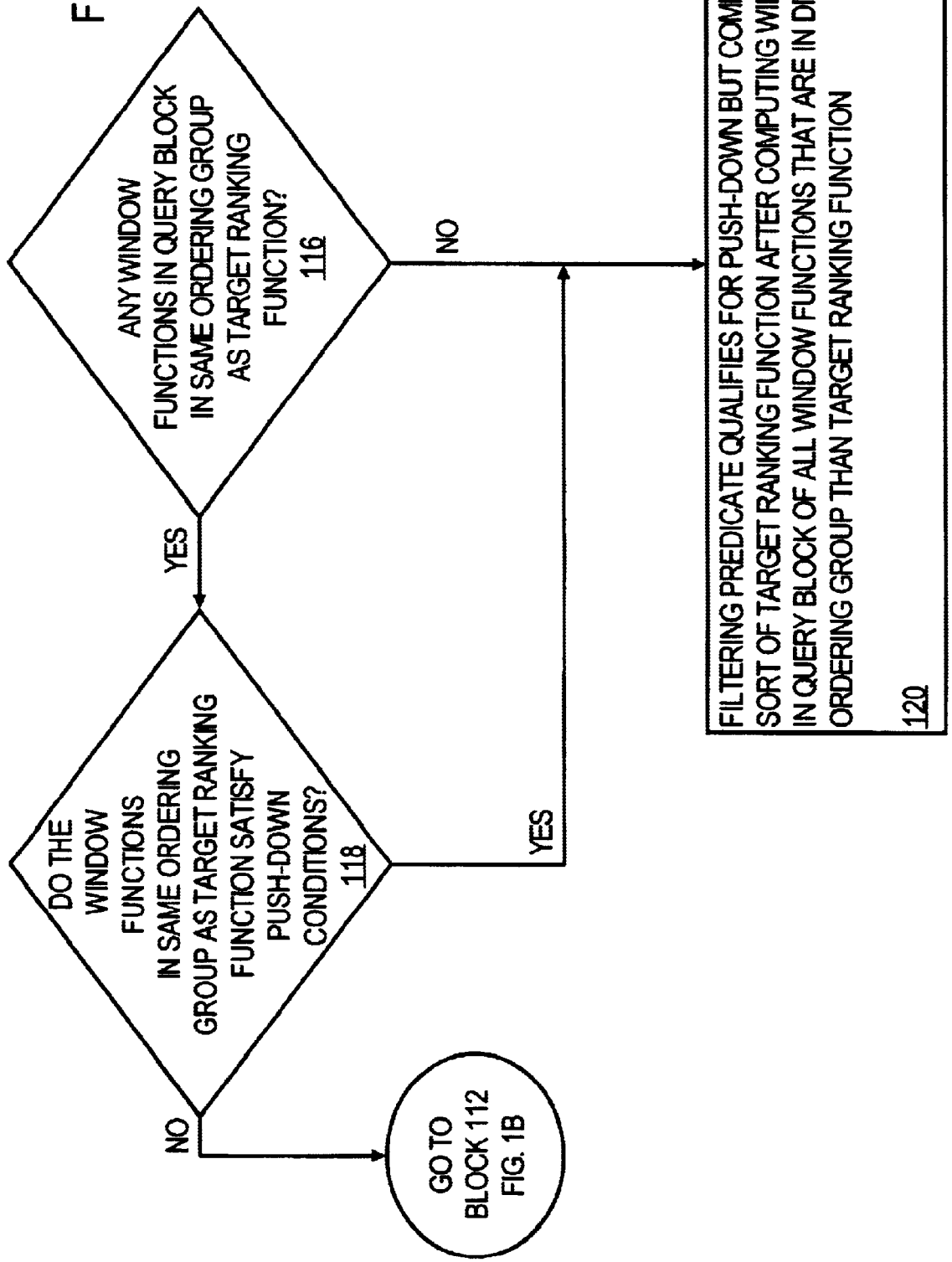

METHOD AND APPARATUS FOR OPTIMIZING COMPUTATION OF OLAP RANKING FUNCTIONS

FIELD OF THE INVENTION

The present invention relates generally to query operations performed within computer systems and, more specifically, to optimizing the computation of OLAP ranking functions.

BACKGROUND OF THE INVENTION

Relational databases store information in indexed tables that are organized into rows and columns. A user retrieves information from the tables by entering a request that is converted to queries by a database application, which then submits the queries to a database server. In response to the queries, the database server accesses the tables specified by the queries to determine which information within the tables satisfies the queries. The information that satisfies the queries is then retrieved by the database server and transmitted to the database application and ultimately to the user.

Online analytical processing ("OLAP") applications, also known as decision support processing applications, are applications that provide analysis of data stored in a database. OLAP applications involve the use of analytic functions. Examples of analytic functions are those functions used in basic business intelligence calculations such as moving averages, rankings and lead/lag comparisons of data. Analytic functions are broadly classified as window functions. Window functions are so named because they operate over a set of rows of data in the database tables. The set of rows upon which the window functions operate are described by a window definition or window size. The window size describes which rows qualify for the window. The window has a starting row and an ending row. For example, a window defined for a moving average would have both the starting and end points of the window slide so that the end points maintain a constant physical or logical range. For example, the following query calculates a 3 month moving average per stock ticker.

AVG (stock_price) OVER (Partition By (stock_name) Order By (time) RANGE '3' MONTH PRECEDING)

The clause "Partition By (stock_name)" partitions the data by stock_name, and the clause "Order By (time)" orders the data time wise within a partition. RANGE '3' MONTH PRECEDING is a logical expression of window size. In the example, the "window" has the logical size of three months. Alternatively, window size may be expressed by a physical interval. That is, the interval may refer to how the data is stored within the database. For example, the following query calculates the moving average for each stock ticker over 90 preceding rows of data.

AVG (stock_price) OVER (Partition By (stock_name) Order By (time) ROWS 90 PRECEDING)

TABLE 1 below illustrates a result set for the query containing the window function "AVG (stock_price) OVER (Partition By (stock_name) Order By (time) RANGE '3' MONTH PRECEDING)". The above window function calculates a moving average of stock price for each stock within a three month window.

TABLE 1

| Stock_name | Time | stock_price | moving_average |
|---|---|---|---|
| ORCL | 1-Jan'99 | 20 | 20 |
| ORCL | 1-Feb'99 | 30 | (20 + 30)/2 = 25 |
| ORCL | 1-Mar'99 | 58 | (20 + 30 + 58)/3 = 36 |
| ORCL | 1-Apr'99 | 11 | (30 + 58 + 11)/3 = 33 |
| ORCL | 1-May'99 | 51 | (58 + 11 + 51)/3 = 40 |
| ABCD | 1-Jan'99 | 25 | 25 |
| ABCD | 1-Feb'99 | 35 | (25 + 35)/2 = 30 |
| ABCD | 1-Mar'99 | 45 | (25 + 35 + 45)/3 = 35 |
| ABCD | 1-Apr'99 | 55 | (35 + 45 + 55)/3 = 45 |
| ABCD | 1-May'99 | 65 | (45 + 55 + 65)/3 = 55 |

Thus, the use of window functions enhances developer productivity because window functions allow for computerized decision support that may be either interactive or batch report jobs.

An important category of window functions is the "ranking" family of window functions. Window functions in the ranking family compute the rank of a row of data with respect to other rows of data in the dataset based on the values of a set of measures. To illustrate, the following query ranks salesmen in Acme Company based on sales amount in each geographical sales region.

SELECT sales_person, sales_region, sales_amount,
RANK ( ) OVER (PARTITION BY sales_region ORDER BY s_amount DESC)
FROM Sales_table;

TABLE 2A below illustrates a result set for the preceding query. The "rank" column in Table 2A lists the sales persons in descending order based on the sales amount. The rank values are reset for each sales region.

TABLE 2A

| sales_person | sales_region | sales_amount | rank |
|---|---|---|---|
| Adams | East | 100 | 1 |
| Baker | East | 99 | 2 |
| Connors | East | 89 | 3 |
| Davis | East | 75 | 4 |
| Edwards | West | 74 | 1 |
| Fitzhugh | West | 66 | 2 |
| Garibaldi | West | 45 | 3 |

Examples of window functions in the ranking family include RANK, DENSE_RANK, NTILE, PERCENT_RANK, ROW_NUMBER, and CUME_DIST. Window functions that belong to the ranking family are hereafter referred to as ranking functions. Ranking functions are widely used in queries for ranking rows of data in a dataset based on some ordering criterion and subsequently filtering out all but the rows in the top-N ranks. For example, assume that the query corresponding to TABLE 2A asked for the top 2 salespersons in each sales region based on the sales amount credited to each sales person. TABLE 2B illustrates a results set where data rows corresponding to a rank that is greater than 2 are filtered out. Queries that result in the computation and selection of top-N ranks are hereafter referred to as "TOP-N" queries.

TABLE 2A

| sales_person | sales_region | sales_amount | rank |
|---|---|---|---|
| Adams | East | 100 | 1 |
| Baker | East | 99 | 2 |

TABLE 2A-continued

| sales_person | sales_region | sales_amount | rank |
|---|---|---|---|
| Edwards | West | 74 | 1 |
| Fitzhugh | West | 66 | 2 |

TOP-N queries are often computationally expensive when massive amounts of data need to be sorted and ranked. Because the use of TOP-N queries is frequent and widespread in the industry, any improvement in computation efficiency of TOP-N queries may amount to significant savings.

Based on the foregoing, there is clear need for a mechanism for optimizing the computation of OLAP Ranking functions.

SUMMARY OF THE INVENTION

Techniques are provided for optimizing the computation of OLAP ranking functions. According to one embodiment, a push-down technique is used whereby the filtering predicate associated with a ranking function is pushed down into the window sort, which filters rows while sorting the data. The set of conditions ensures that the push down technique does not result in filtering out data that is needed in other window sorts in the query.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A–1C are flowcharts that illustrate an overview of one embodiment of the invention;

DETAILED DESCRIPTION OF THE PREFERRED EMBODIMENT

Figure 1B:
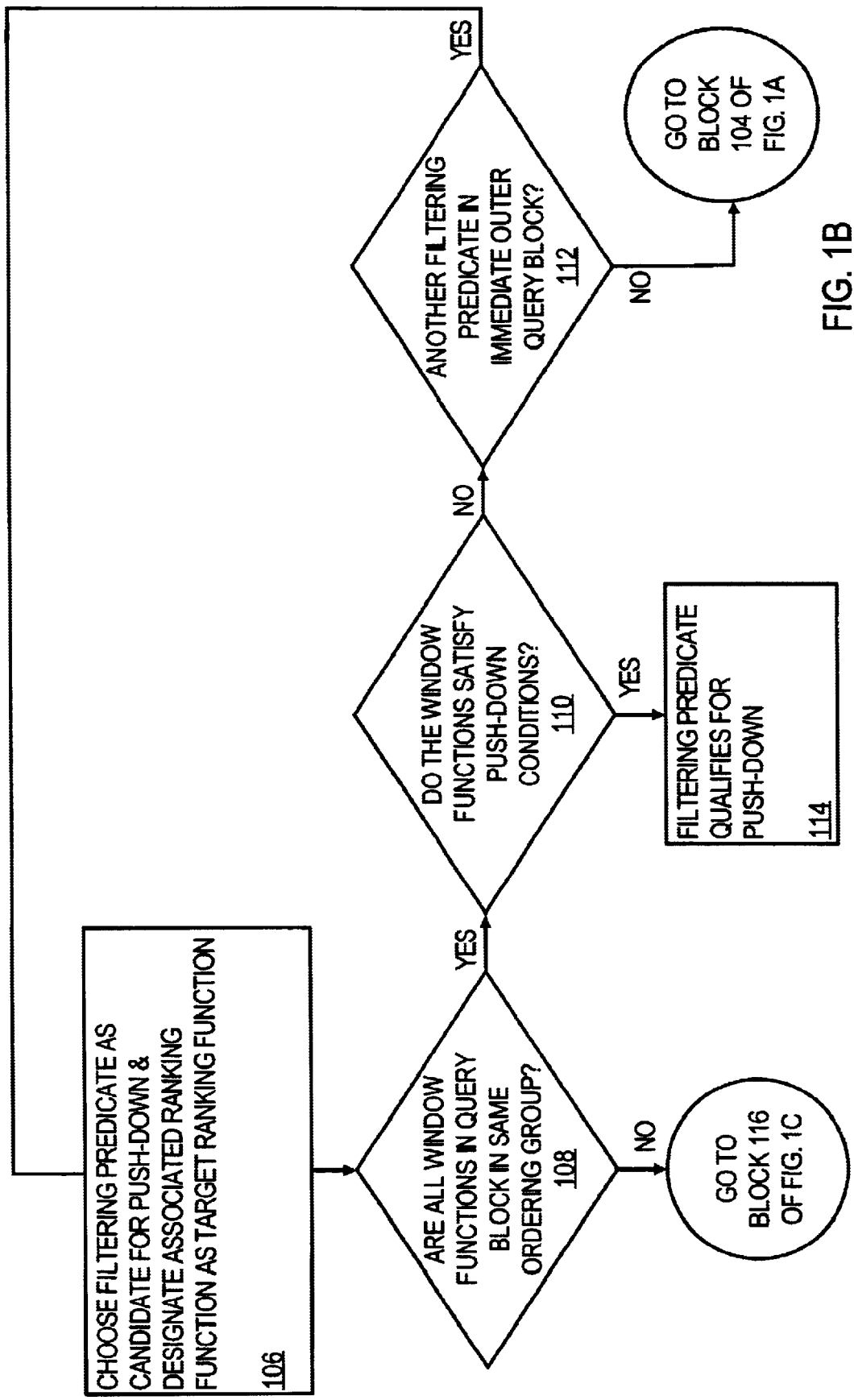

Techniques are provided for optimizing the computation of OLAP ranking functions. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

In one embodiment of the invention, the computation of OLAP ranking functions is optimized by filtering data based on the predicate of a given ranking function during the window sort procedure associated with the particular ranking function. To illustrate, a typical OLAP query has the following general structure:

SELECT deptno, ename, salary, rnk
FROM (select deptno, ename, salary,
   RANK OVER (Partition By deptno Order By salary DESC) as rnk
   FROM EmpTable)
WHERE rnk<=5
ORDER BY rnk;

The syntax used in the preceding statements is merely illustrative. The actual syntax of statements involving OLAP queries may vary from implementation to implementation. The present invention is not limited to any particular syntax.

The embodiment is described, in part, with reference to the structure of the query. The above query retrieves a result set that displays the identities and salaries of the top 5 highest salaried employees in each department in a company. In the context of structure, the above query is generally referred to as a query block. The query block comprises an inner query block and an outer query block. The inner query block may comprise one or more window functions.

In the above sample query, the inner query block is the indented portion of the query block. The inner query block contains the ranking function, "RANK OVER (Partition By deptname Order By salary DESC) as rnk", which is a window function from the ranking family of window functions. "Rnk<=5" is a predicate on the ranking function and appears in the immediate outer query block. Window functions allow for the division of a query result set into groups of rows called "Partitions". Thus, references herein to partitions in the context of window functions are unrelated to the partitioning models for managing very large tables and indexes. Examples of partitioning models for managing very large tables and indexes are hash partitioning and composite partitioning etc. In the above sample query, the clause "Partition By deptname" causes a result set of rows of data that are grouped by department name. The clause, "Order By salary DESC" causes the rows of data in each department group to be ordered in descending order of salary. The predicate in the outer query block, "rnk<=5", filters all but the top 5 rows of data in each department group before presenting the result set in response to the query.

Ordinarily, filtering occurs after the data has been sorted. Before filtering of the data occurs, the data is first sorted during the window sort of the ranking function corresponding to the predicate. In contrast, techniques described herein filter the data much earlier by pushing the filtering operation down into a lower level of rank computation, which is sorting of the data. The technique of pushing the filtering operation down into a lower level of computation is hereafter referred to as "push-down".

TABLE 3 represents a possible result set in response to the above sample query.

TABLE 3

| deptname | Ename | Salary | Rnk |
|---|---|---|---|
| engineering | Adams | 100K | 1 |
| engineering | Baker | 99K | 2 |
| engineering | Edwards | 74K | 3 |
| engineering | Fitzhugh | 66K | 4 |
| engineering | Garibaldi | 60K | 5 |
| marketing | Smith | 85K | 1 |
| marketing | Goodman | 80K | 2 |
| marketing | Peterman | 79K | 3 |
| marketing | Botticelli | 60K | 4 |
| marketing | Maxmillian | 55K | 5 |

For the purpose of explanation, assume that a query block has N window functions, F1, F2, . . . , Fn. Assume that F is one of the ranking functions in the query block, and that P, in the immediate outer query block, is the predicate associated with F. The predicate associated with a ranking function is hereafter referred to as a "filtering predicate". FIG. 1A, FIG. 1B, and FIG. 1C are flowcharts that illustrates an overview of the steps involved in a query processing technique that implements one embodiment of the invention. At block 102 in FIG. 1, it is determined whether there is at least one filtering predicate, in the immediate outer query block, that is associated with a ranking function that is in the current query block. If it is determined that there is at least one filtering predicate in the outer query block associated with a ranking function, then at block 106 of FIG. 1B, the first filtering predicate in the outer query block is chosen as a potential candidate for push-down, and the associated ranking function is designated as the corresponding target ranking function. The target ranking function is herein defined to be the ranking function for which the window sort computation involves a filtering predicate push-down. In one embodiment, if there are more than one filtering predicate in the outer query block and each filtering predicate is associated with a ranking function in the query block, then the filtering predicate that can filter out the most rows of data is chosen as the potential candidate for push-down. Otherwise, at block 104 of FIG. 1A, the process is at an end because no predicate qualifies for push-down.

At block 108 of FIG. 1B, it is determined whether all the window functions in the query block are in the same ordering group. An ordering group is a set of window functions that have ordering requirements that can be satisfied by a single sort operation. The concept of Ordering Groups may be illustrated by the following example.

Assume that a query contains the following multiple window functions A1, A2, A3:

A1) SUM (sales) OVER (PARTITION BY region) sum_region,

A2) SUM (sales) OVER (PARTITION BY region, state) sum_region_state,

A3) RANK ( ) OVER (PARTITION BY region ORDER BY sales DESC) rank.

Each of the above window functions requires a sort operation. Window function A1 requires a sort on "region". Window function A2 requires a sort on "region, state". Window function A3 requires a sort on "region, sales DESC". However, by simply sorting the data once on "region, state" only, both window functions A1 and A2 would be satisfied in one sorting opeation. Thus, window functions A1 and A2 may be grouped together as an Ordering Group because they can be satisfied by a single sort operation by sorting on "region, state". The remaining Window function A3 would then be classified as another Ordering Group by default. However, if, for example, the above query contains an additional window function A4 that requires a sort on "sales DESC", then window functions A3 and A4 may be grouped as an Ordering Group because they can be satisfied by a single sort operation by sorting on "region, sales DESC".

If it is determined that all the window functions in the query block belong to the same ordering group, then at block 110 of FIG. 1B, it is determined whether the window functions satisfy the push-down conditions. The set of push-down conditions are herein described in greater detail with reference to FIG. 2 through FIG. 6. If, at block 110, it is determined that the window functions satisfy the push-down conditions, then the filtering predicate qualifies for push-down as indicated by block 114 of FIG. 1B. Otherwise, at block 112 of FIG. 1B, it is determined whether there is another filtering predicate in the immediate outer query block that is associated with a ranking function in the query block. If it is determined that there is another filtering predicate in the immediate outer query block that is associated with a ranking function in the query block, then control returns to block 106. Otherwise, control returns to block 104 of FIG. 1A because no filtering predicate qualifies for push-down.

At block 108, if it is determined that not all the window functions in the query block are in the same ordering group as that of the target ranking function, then at block 116 of FIG. 1C, it is determined whether there are any window functions in the query block that are in the same ordering group as that of the target ranking function. If it is determined that there are no other window functions in the query block that are in the same ordering group as that of the target ranking function, then the filtering predicate qualifies for push-down into the window sort of the target ranking function. However, the window sort of the target window is computed after computing the window sorts in the query block of all window functions that are in a different ordering group than that of the target ranking function as indicated by block 120.

At block 116, if it is determined that there are some window functions in the query block that are in the same ordering group as that of the target ranking function, then at block 118 of FIG. 1C, it is determined whether those window functions that are in the same ordering group as that of the target ranking function satisfy the push-down conditions. If the window functions satisfy the push-down conditions, then control passes to block 120 of FIG. 1C. Otherwise, control passes to block 112 of FIG. 1B.

PUSH-DOWN CONDITIONS

A set of push-down conditions must be met before the push-down technique may be employed. The set of push-down conditions is explained with reference to FIG. 2 through FIG. 6. All the conditions in the set of push-down conditions need to be satisfied before a filtering predicate can be pushed down into the window sort operation of the target ranking function.

Figure 2:
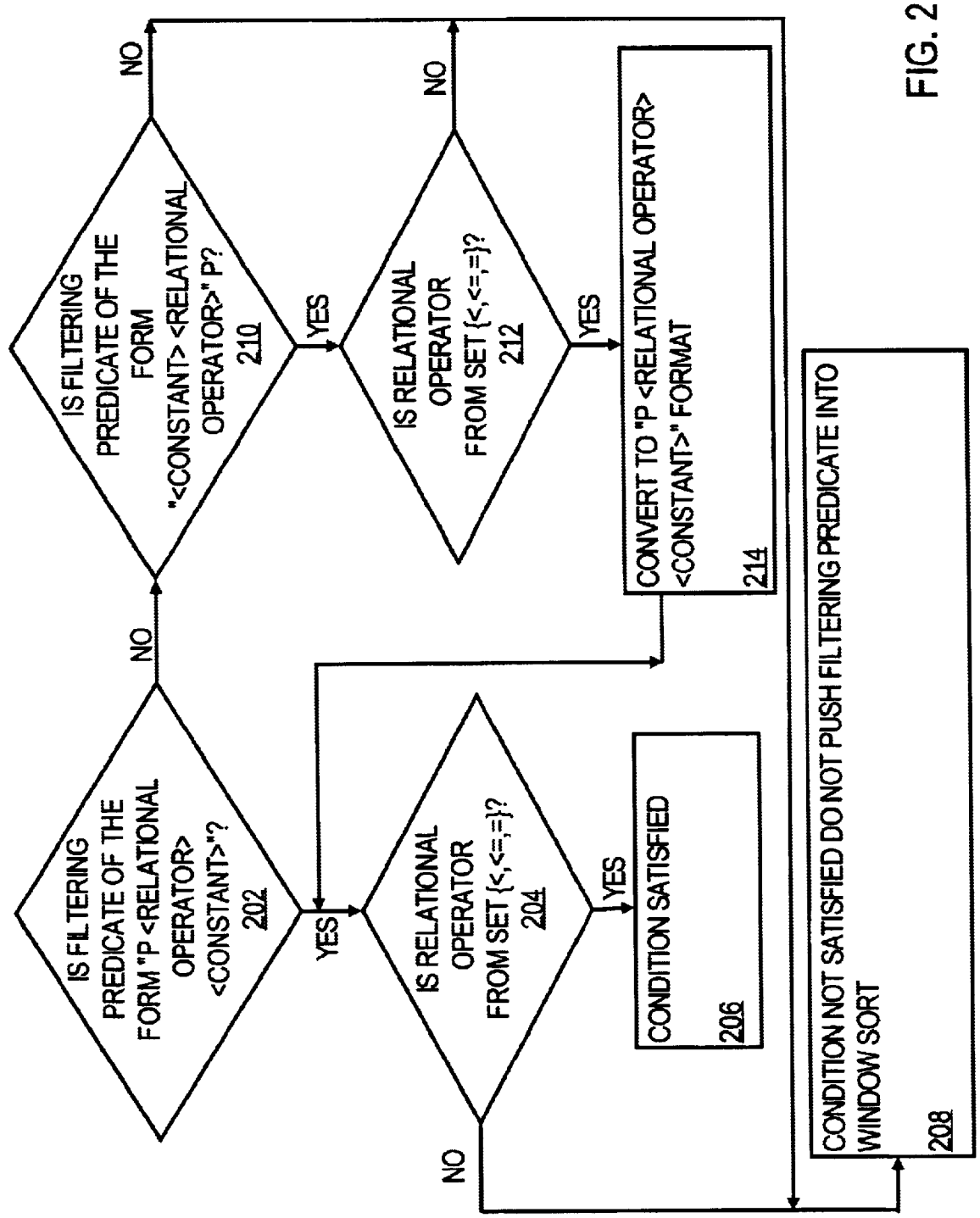
FIG. 2 is a flowchart that illustrates the condition to be satisfied by the filtering predicate associated with the target ranking function.

FIG. 2 is a flowchart that illustrates the condition to be satisfied by the filtering predicate associated with the target ranking function. At block 202, it is determined whether the filtering predicate is of the form:

"P<relational operator><constant>"

where P can be Rank, Dense_Rank and Row_Number

If, at block 202, it is determined that the filtering predicate is of the form "P<relational operator><constant>", then at block 204, it is determined whether the relational operator is from the set {<,<=, =}. If the relational operator is from the set {<,<=, =}, then the condition is satisfied by the filtering predicate, as indicated at block 206. If the relational operator is not from the set {<,<=, =}, then the condition is not satisfied by the filtering predicate, and the predicate may not be pushed down into the window sort computation of the target ranking function, as indicated at block 208.

If, at block 202, it is determined that the filtering predicate is not of the form "P<relational operator><constant>", then at block 210, it is determined whether the filtering predicate is of the form:

"<constant><relational operator>P"

where P is the rank

If, at block 210, it is determined that the filtering predicate is not of the form "<constant><relational operator>P", then the condition is not satisfied and control passes to block 208. Otherwise, if it is determined that the filtering predicate is of the form "<constant><relational operator>P", then at block 212, it is determined whether the relational operator is from the set {>, >=, =}. If the relational operator is not from the set {>,>=, }, then the condition is not satisfied and control passes to block 208. If the relational operator is from the set {>, >=, =}, then at block 214, the filtering predicate, P, is converted to the form "P<relational operator><constant>". Control then passes to block 204. For example, 10>P is converted to P<10 and 10>=P is converted to P<=10.

When the filtering predicate is of the form "P =<constant>", the relational operator, "=" is converted to "<=" before the predicate is pushed down into the window sort operation. The filtering predicate is reset to "=" in the final filtering run.

The condition that the filtering predicate be of the form "P<relational operator><constant>" where the relational operator is from the set {<,<=} ensures that data is inadvertently filtered out in individual runs during a push-down window sort computation of the target ranking function because ranking functions return integer values in increasing order. The use of individual runs and the execution of push-down window sort computations are described herein in greater detail in the subsection entitled "SERIAL EXECUTION WITH PUSH-DOWN OPTIMIZATION".

Figure 3:
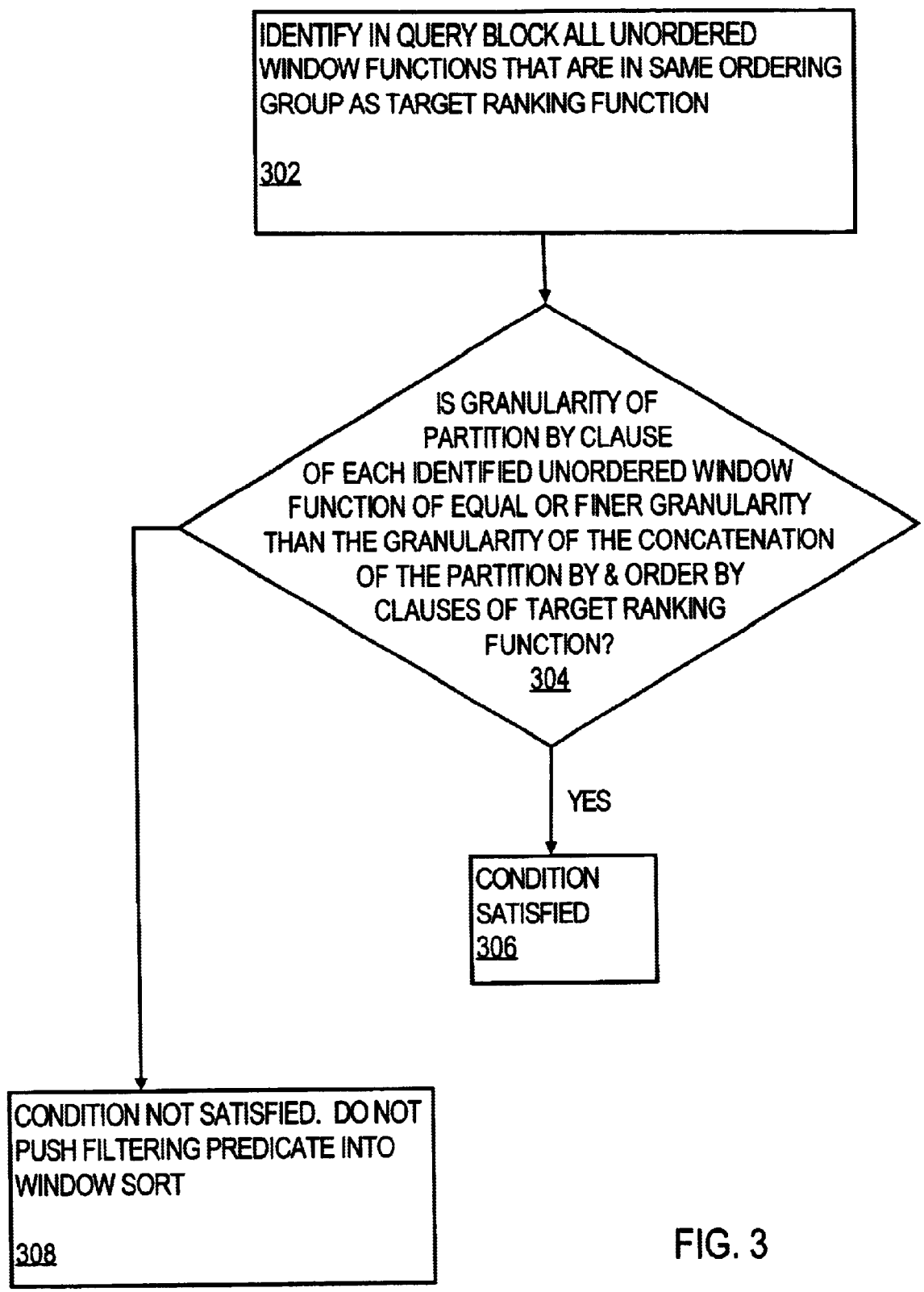
FIG. 3 is a flowchart that illustrates the condition that is to be satisfied by unordered window functions in the query block.

FIG. 3 is a flowchart that illustrates the condition that is to be satisfied by unordered window functions in the query block, and which unordered window functions are in the same ordering group as that of the target ranking function. At block 302, all unordered window functions that are in the same ordering group as that of the target ranking function are identified in the query block. At block 304, it is determined whether the granularity of the "Partition By" clause of each identified unordered window function is of equal or finer granularity than the granularity of the concatenation of the "Partition By" and "Order By" clauses of the target ranking function. If it is determined that the granularity of the "Partition By" clause of each identified unordered window function is of equal or finer granularity than the granularity of the concatenation of the "Partition By" and "Order By" clauses of the target ranking function, then the condition is satisfied as indicated by block 306. Otherwise, the condition is not satisfied, and the filtering predicate may not be pushed down into the window sort of target ranking function, as indicated by block 308.

For example, if the target ranking function and an unordered window function in the query block are respectively, Sum(sal) Over (Partition By x, y)

The "Partition By" clause of the target ranking function is,

P( )={x}

The "Order By" clause of the target ranking function is,

O( )={y}

If the concatenation of the "Partition By" and "Order By" clauses of the target ranking function is denoted by G( ), then

G( )=P( )||O( )

Thus, G( )={x, y}

The above sample unordered window function "Sum(sal) Over (Partition By x, y)" may be satisfied by a sort on x, y. Similarly, the target ranking function "Rank( ) Over (Partition By x Order By y" may be satisfied by a sort on x, y. Thus, the above sample target ranking function and unordered window function comprise an ordering group. The "Partition By" clause of the unordered window function "Sum(sal) Over (Partition By x, y)" is P( ) of unordered window function={x, y}

Thus, P( ) of unordered window function=G( ) of the target ranking function. If, for example, the unordered window function is "Sum(sal) Over (Partition By x, y, z)", it would still satisfy the condition as expressed at block 304 of FIG. 3 because.

P( ) of unordered window function={x, y, z}

Thus, P( ) of unordered window function is of finer granularity than G( ) of the target ranking function.

However, if the unordered window function is "Sum(sal) Over (Partition By x)", it would not satisfy the condition as expressed at block 304 of FIG. 3 because P( ) of unordered window function={x}, which is of coarser granularity than G( ) of the target ranking function.

Figure 4:
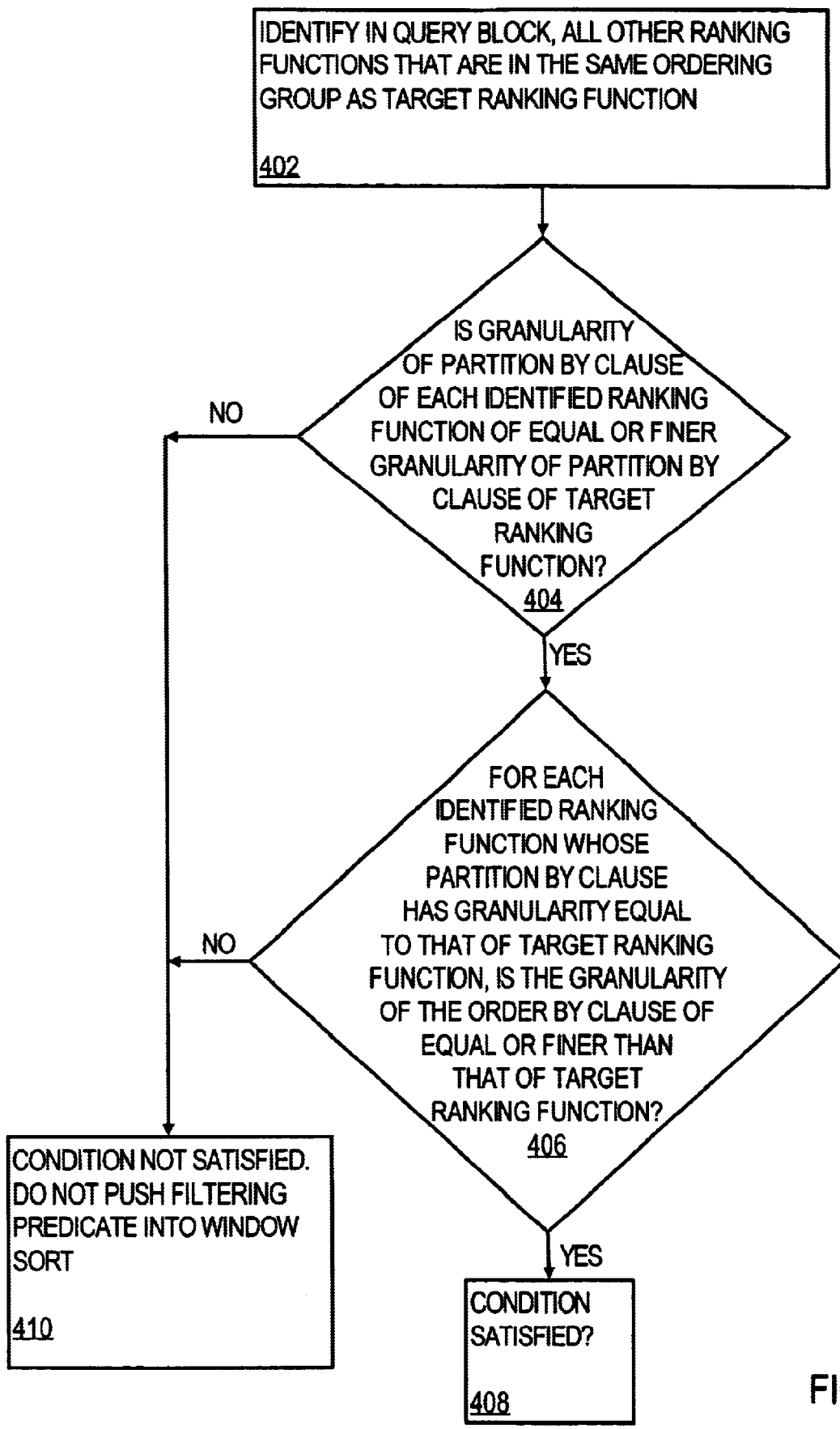
FIG. 4 is a flowchart that illustrates the condition that is to be satisfied by all ranking functions other than the target ranking function in the query block.

FIG. 4 is a flowchart that illustrates the condition that is to be satisfied by all other ranking functions in the query block, and which ranking functions are in the same ordering group as that of the target ranking function. At block 402, all ranking functions that are in the same ordering group as that of the target ranking function are identified in the query block. At block 404, it is determined whether the granularity of the "Partition By" clause of each identified ranking function is of equal or finer granularity than the granularity of the "Partition By" clause of the target ranking function. If it is determined that the granularity of the "Partition By" clause of each identified ranking function is not of equal or finer granularity than the granularity of the "Partition By" clause of the target ranking function, then the condition is not satisfied, and the filtering predicate may not be pushed down into the window sort computation of the target ranking function, as indicated at block 410.

If, at block 404, it is determined that the granularity of the "Partition By" clause of each identified ranking function is of equal or finer granularity than the granularity of the "Partition By" clause of the target ranking function, then at block 406, it is determined whether, for each identified ranking function whose "Partition By" clause has a granularity equal to the granularity of the "Partition By" clause of the target ranking function, the granularity of the "Order By" clause is of equal or finer granularity than the granularity of the "Order By" clause of the target ranking function. If it is determined that the granularity of the "Order By" clause is of equal or finer granularity than the granularity of the "Order By" clause of the target ranking function, then the condition is satisfied, as indicated at block 408. Otherwise, control passes to block 410.

For example, if the target ranking function and other ranking functions in the query block are respectively, F: Rank( ) Over (Partition By x Order By y)

F1: Rank( ) Over (Partition By x, y Order By z)

F2: Rank( ) Over (Partition By x Order By y, z)

The "Partition By" clause of the ranking function is P( ) of F={x}

The "Order By" clause of the ranking function is O( ) of F={y}

In the above example, ranking functions, F1 and F2, may be satisfied by a sort operation on x, y, z. The same sort operation on x, y, z may be used to satisfy the target ranking function, F=Rank( ) Over (Partition By x Order By y). Thus, F, F1, F2 comprise an ordering group.

The "Partition By" clause of F1 is P( ) of F1 {x, y}. Thus, F1 satisfies the condition of block 404 in FIG. 4 because the granularity of P( ) of F1 is of finer granularity than the granularity of P( ) of F. Similarly, the "Partition By" clause of F2 is P( ) of F2={x}. Thus, F2 satisfies the condition as indicated by block 404 because the granularity of P( ) of F2 is of equal granularity as the granularity of P( ) of F. Further, F2 satisfies the condition of block 406 because the "Order By" clause of F2 is O( ) of F2={y, z}. Thus, the granularity of O( ) of F2 is finer than the granularity of O( ) of F.

However, assume there exists in the query block another ranking function such as, F3: Rank( ) Over (Order By x)

The "Partition By" clause of F3 is the null set. Thus, F3 would not satisfy the condition as expressed at block 404 because.

P( ) of F3={ }, which is of coarser granularity than P( ) of F={x}, where F is the target ranking function.

Figure 5:
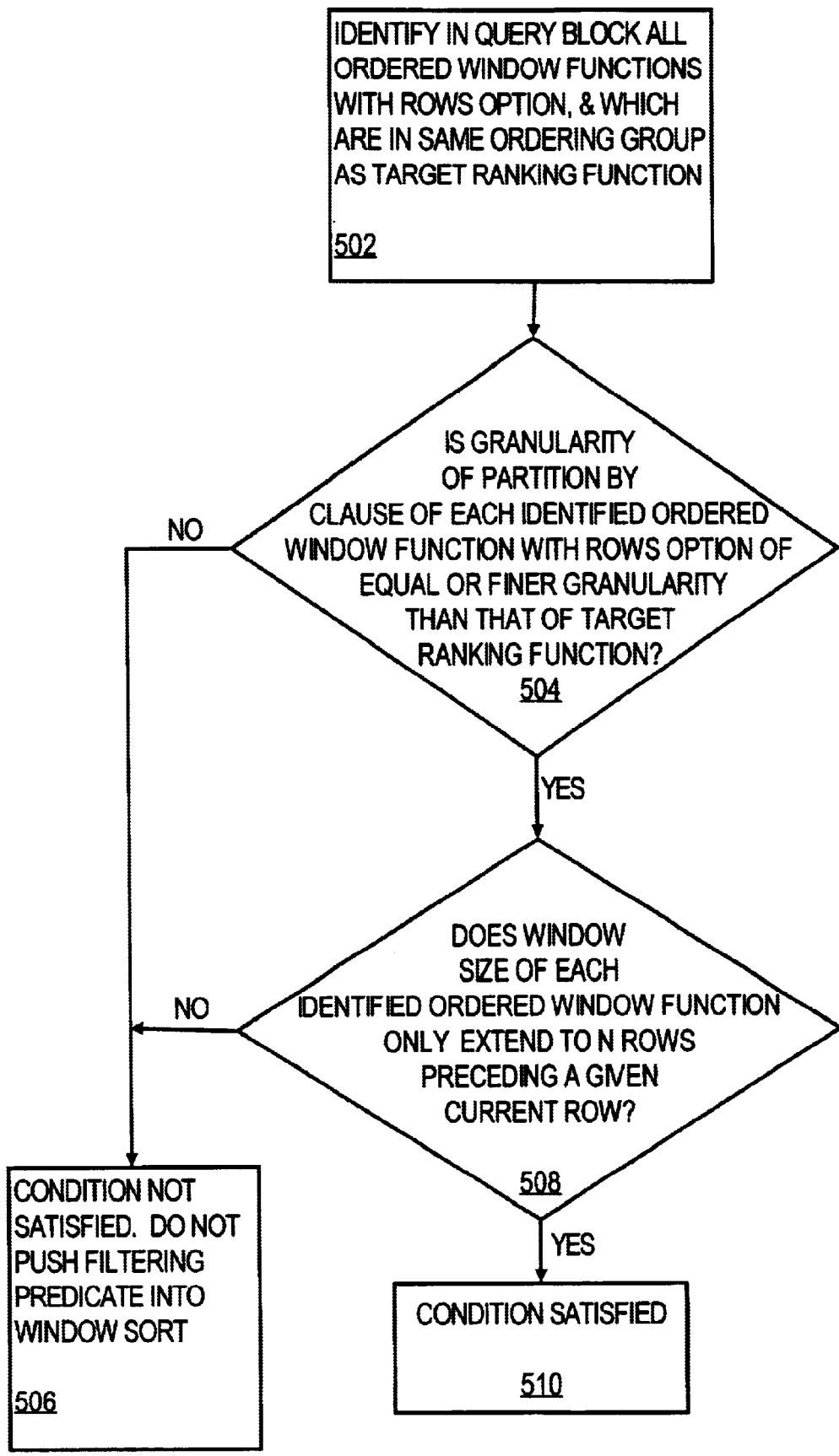
FIG. 5 is a flowchart that illustrates the condition that is to be satisfied by all ordered window functions with ROWS option in the query block.

FIG. 5 is a flowchart that illustrates the condition that is to be satisfied by all ordered window functions with ROWS option in the query block, and which window functions are in the same ordering group as that of the target ranking function. At block 502, all window functions with ROWS option that are in the same ordering group as that of the target ranking function are identified in the query block. At block 504, it is determined whether the granularity of the "Partition By" clause of each identified ordered window function with ROWS option is of equal or finer granularity than the granularity of the "Partition By" clause of the target ranking function. If it is determined that the granularity of the "Partition By" clause of each identified ordered window function is not of equal or finer granularity than the granularity of the "Partition By" clause of the target ranking function, then the condition is not satisfied, and the filtering predicate may not be pushed down into the window sort computation of the target ranking function, as indicated at block 506. Otherwise, if the granularity of the "Partition By" clause of each identified ordered window function is of equal or finer granularity than the granularity of the "Partition By" clause of the target ranking function, then at block 508 it is determined if the window size of each identified ordered window function only extends to N rows preceding the current row on which the ordered window function is operating, and where N is any positive integer number. If it is determined that the window size of each identified ordered window function only extends to N rows preceding the current row on which the ordered window function is operating, then the condition is satisfied, as indicated at block 510. Otherwise, control passes to block 506.

For example, if the target ranking function and the ordered window functions with ROWS option in the query block are respectively, F: Rank( ) Over (Order By x)

F1: Sum(sal) Over (Order By x ROWS 1 preceding)

F2: Sum(sal) Over (Partition By x Order By y ROWS 1 preceding)

The "Partition By" clause of the ranking function is P( ) of F={ }

The "Order By" clause of the ranking function is O( ) of F={y}

In the above example, ordered window functions with ROWS option, F1 and F2, may be satisfied by a sort operation on x, y. The same sort operation on x, y may be used to satisfy the target ranking function, F=Rank( ) Over (Order By x). Thus, F, F1, F2 comprise an ordering group.

The "Partition By" clause of F1 is P( ) of F1={ }. Thus, F1 satisfies the condition of block 504 in FIG. 5 because the granularity of P( ) of F1 is equal to the granularity of P( ) of F. Similarly, the "Partition By" clause of F2 is P( ) of F2={x}. Thus, F2 satisfies the condition as indicated by block 504 because the granularity of P( ) of F2 is finer than the granularity of P( ) of F.

Recall that the filtering predicate of the target ranking function is from the set {<,<=}. Thus, only ordered window functions with "ROWS PRECEDING" the current row of operation will operate on a correct set of data because the pushed down filtering predicate of the target ranking function will have ordered and filtered out rows of data "FOLLOWING" the current row of operation. In the example, F1, F2, each have a window size that extends to N ROWS preceding. In the example, N=1. The window size extends to one row preceding the current row of operation and thus satisfies the condition as expressed at block 508 of FIG. 5. However, assume there exists in the query block another ordered window function with ROWS option such as, FF: Sum(sal) Over (Order By x ROWS 20 following)

The window size of FF extends to 20 rows following the current row of operation. Thus, FF would not satisfy the condition as expressed at block 508.

In another embodiment of the invention, the condition of N ROWS preceding may be relaxed as illustrated by the following example. Assume that F is the target ranking function and F1 . . . F6 are window functions that are ordered with ROWS option.

F: P(X,Y,Z)O(A,B,C)
F1: P(X,Y,Z)O(A,B,C)
F2: P(X,Y,Z)O(A,B,C,D)
F3: P(X,Y,Z)O(A,B)
F4: P(X,Y,Z,A)O(B)
F5: P(X,Y,Z.A)O(B,C)
F6: P(X,Y,Z,A)O(B,C,D)

The window size corresponding to each of the above functions is described in TABLE WS below.

TABLE WS

| Window Function | Window can extend up to (or window size) |
| --- | --- |
| F1 | Current row |
| F2 | Any row preceding or following the current row, i.e., any window size |
| F3 | At least one row preceding current row |
| F4 | Any row preceding or following the current row, i.e., any window size |
| F5 | Any row preceding or following the current row, i.e., any window size |
| F6 | Any row preceding or following the current row, i.e., any window size |

For F1, the window size may extend up to N rows preceding the current row or to the current row itself. For F2, the window size may extend to rows preceding or following the current row, i.e., there are no restrictions to the window size. For F3, the window size may extend to at least one row preceding the current row. For F4, F5, F6, the window size may extend to rows preceding or following the current row, i.e., there are no restrictions to the window size.

Figure 6:
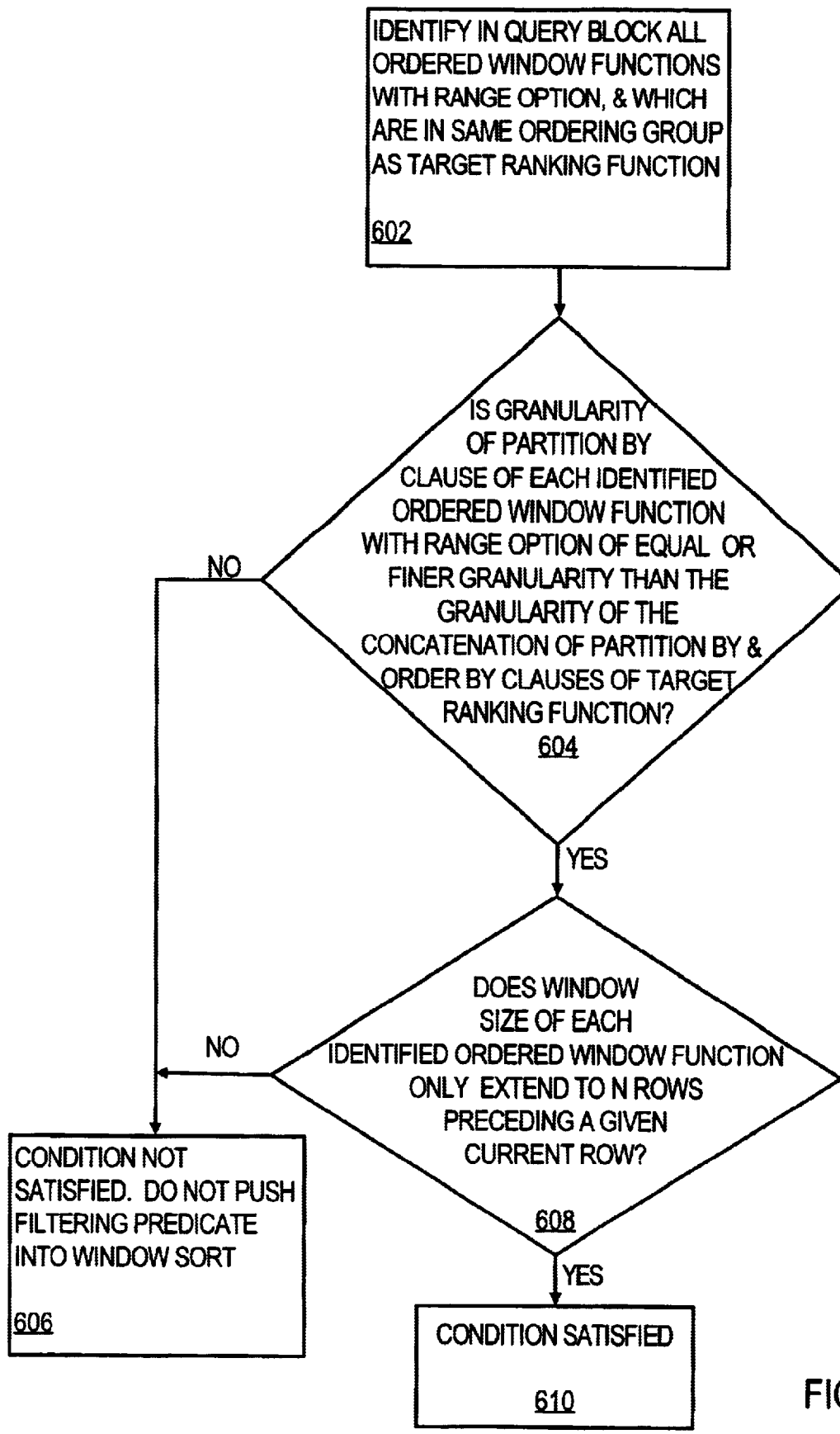
FIG. 6 is a flowchart that illustrates the condition that is to be satisfied by all ordered window functions with RANGE option in the query block.

FIG. 6 is a flowchart that illustrates the condition that is to be satisfied by all ordered window functions with RANGE option in the query block, and which window functions are in the same ordering group as that of the target ranking function. At block 602, all window functions with RANGE option that are in the same ordering group as that of the target ranking function are identified in the query block. At block 604, it is determined whether the granularity of the "Partition By" clause of each identified ordered window function with RANGE option is of equal or finer granularity than the granularity of the concatenation of the "Partition By" and "Order By" clauses of the target ranking function. If it is determined that the granularity of the "Partition By" clause of each identified ordered window function is not of equal or finer granularity than the granularity of the concatenation of the "Partition By" and "Order By" clauses of the target ranking function, then the condition is not satisfied, and the filtering predicate may not be pushed down into the window sort computation of the target ranking function, as indicated at block 606. Otherwise, if the granularity of the "Partition By" clause of each identified ordered window function is of equal or finer granularity than the granularity of the concatenation of the "Partition By" and "Order By" clauses of the target ranking function, then at block 608 it is determined if the window size of each identified ordered window function only extends to N rows preceding the current row on which the ordered window function is operating, and where N is any positive integer number. If it is determined that the window size of each identified ordered window function only extends to N rows preceding the current row on which the ordered window function is operating, then the condition is satisfied, as indicated at block 610. Otherwise, control passes to block 606. However, in another embodiment of the invention, the N rows preceding condition may be relaxed as explained herein with respect to the ROWS option above.

If the target ranking function and the ordered window functions with RANGE option in the query block are respectively, F: Rank( ) Over (Order By x, y)
F1: Sum(sal) Over (Partition By x, y Order By a RANGE 1 preceding)
The "Partition By" clause of the ranking function is P( ) of F={ }
The "Order By" clause of the ranking function is O( ) of F={x, y}
If the concatenation of the "Partition By" and "Order By" clauses of the target ranking function is denoted by G( ), then
G( )=P( )||O( )
Thus, G( )={x, y}

In the above example, ordered window function with RANGE option, F1, may be satisfied by a sort operation on x, y, a. The same sort operation on x, y, a may be used to satisfy the target ranking function, F=Rank( ) Over (Order By x, y). Thus, F, F1 comprise an ordering group.

The "Partition By" clause of F1 is P( ) of F1={x, y}. The granularity of P( ) of F1 is equal to the granularity of G( ) of F. Thus, F1 satisfies the condition as indicated by block 604.

In the example, F1 has a window size that extends to RANGE N preceding. In the example, N=1. The window size extends to one row preceding the current row of operation and thus satisfies the condition as expressed at block 608 of FIG. 6. However, assume there exists in the query block another ordered window function with RANGE option such as, F2: Sum(sal) Over (Order By x, RANGE between current row and 20 following)

The window size of F2 extends to a RANGE of 20 following the current row of operation. Thus, F2 would not satisfy the condition as expressed at block 608. For example:

F1: Rank( ) Over( Order By x)
F2: Sum(sal) Over (Order By x, RANGE between current row and 20 following)
Let P<=3

Assume that the data values for x, sal, Rank( ) Over( Order By x) and Sum(sal) Over (Order By x, RANGE between current row and 20 following) are as indicated in Table EMPDATA below.

| | | EMPDATA | |
|---|---|---|---|
| X | Sal | Rank() Over | Sum(sal) Over |
| 1 | 10 | 1 | 40 |
| 2 | 20 | 2 | 50 |
| 3 | 10 | 3 | 60 |
| 4 | 20 | 4 | 90 |
| 5 | 30 | 5 | 120 |
| 6 | 40 | 6 | 100 |
| 7 | 50 | 7 | 60 |
| 8 | 10 | 8 | 10 |

Assume x=3 is the current row of operation. For the current row x=3, the window extends from x=3 to x=5. Thus, if the filtering predicate P<=3 is applied during the sort operation then the rows where x>3 will be filtered out, and F1 for the current row will be incorrectly computed as 10 instead of 60.

SERIAL EXECUTION WITH PUSH-DOWN OPTIMIZATION

For the purpose of illustrating the push-down technique during a serial execution of a query block, a comparison is made between the serial execution of a window sort operation without a filtering predicate push-down and the serial execution window sort operation with a filtering predicate push-down. The following query block and data set are used as examples in the illustration of the push-down technique. Assume that the target ranking function in the query block and the corresponding filtering predicate in the outer query block are respectively:

Rank( ) over (Order By x) RK
SELECT
From (Select Rank( ) Over (Order By x) Rk, F1, . . . Fn)
Where Rk<=3

Further assume that the window functions F1, . . . FN in the query block are in the same ordering group as the target ranking function and that they satisfy all the push-down conditions as described herein. Assume that the data set upon which the window sort operates is, column x={5,1,2,3,4,6,1,2,3,5,5,5,7,4,6}

During serial execution of a window sort operation without a filtering predicate push-down, data items from the data set upon which the sort operation is performed are read into memory for performing the sort operation until the memory is exhausted. When the memory is exhausted, the sorted data items in memory is written to disk in order to reuse the memory for reading in more data items from the data set and performing the sort operation. Thus, at any given time, only one subset of the data set is read into memory for performing the sort operation. Each subset of sorted data items that is written to disk is herein referred to as a "sort run". Thus, the number of sort runs depends on the size of the data set and the amount of memory available for the sort operation. Each data item within each sort run is sorted with respect to the other data items in the sort run, according to the sort criterion specified by the target ranking function. However, the data items in each sort run may not be sorted with respect to data items in other sort runs. The sort operation is not complete until the data items in each sort run are sorted with respect to data items in other sort runs. Thus, the sort runs are merged in order to complete the sort operation. Depending on the size of the data set and the amount of memory available to the sort operation, several levels of merging sort runs may be required to complete the sort operation. Each level of merging sort runs is herein referred to as a "merge pass". The sort run resulting from the final merge pass is herein referred to as a "final sort run".

Using the above example query block and data set, sort runs may appear as follows. For purposes of simplicity, assume the memory is exhausted after reading and sorting a subset of the data set comprising 5 data items at a time and that only one merge pass is required to complete the sort operation.

Sort Run 1={1,2,3,4,5} corresponding to reading and sorting the subset {5,1,2,3,4}

Sort Run 2={1,2,3,5,6} corresponding to reading and sorting the subset {6,1,2,3,5}

Sort Run 3={4,5,5,6,7} corresponding to reading and sorting the subset {5,5,7,4,6}

The final sort run after the merge pass={1,1,2,2,3,3,4,4, 5,5,5,5,5,6,6,7}

Thus, the serial execution of a window sort operation of the target ranking function, "Rank( ) over (Order By x) RK", without a filtering predicate push-down produces the result set {1,1,2,2,3,3,4,4,5,5,5,5,5,6,6,7}. The filtering predicate RK<=3 is applied only to the final sort run when there is no push-down. In order to apply the filtering predicate to the final sort run, the data items in the final sort run are ranked. Once the data items are ranked, only the data items satisfying the filtering conditions are retained. For example,

| | |
|---|---|
| Final Sort Run before applying filtering predicate: | 1,1,2,2,3,3,4,4,5,5,5,5,5,6, 6, 7 |
| Rank: | 1,1,3,3,5,5,7,7,9,9,9,9,9,14,14,16 |
| Then, | |
| Final Sort Run after applying filtering predicate RK <= 3 is: | 1, 1, 2, 2 |

In contrast, the sort runs resulting from the serial execution of a window sort operation with a filtering predicate push-down contain data items that are ordered, ranked and filtered with respect to every other data item within the sort run.

As before, for purposes of simplicity, assume the memory is exhausted after reading and sorting a subset of the data set comprising 5 data items at a time and that only one merge pass is required to complete the sort operation. The filtering predicate RK<=3 is pushed down into the individual sort runs. Thus, each sort run contains data items that are ordered with respect to every other data item within the sort run, and each sort run contains only data items that have a rank of less than or equal to 3. In order to apply the filtering predicate to a sort run, the sorted data in the sort run is ranked. Once the data is ranked, only the data items above the rank specified by the filtering predicate (top-N ranks) is retained before the sort run is written to disk. The filtering predicate is pushed down into sort runs at every merger pass including the final sort run.

Thus, the sort runs resulting from the serial execution of a window sort operation with a filtering predicate push-down using the above example query block and data set may appear as follows:

| | |
|---|---|
| Sort Run 1 before applying filtering predicate: | 1,2,3,4,5 |
| Rank: | 1,2,3,4,5 |
| Sort Run 1 after applying filtering predicate: | 1,2,3 |
| Sort Run 2 after applying filtering predicate: | 1,2,3,5,6 |
| Rank: | 1,2,3,4,5 |
| Sort Run 2 after applying filtering predicate: | 1,2,3 |
| Sort Run 3 after applying filtering predicate: | 4,5,5,6,7 |
| Rank: | 1,2,2,4,5 |
| Sort Run 3 after applying filtering predicate: | 4,5,5 |
| The final sort run before applying filtering predicate: | 1,1,2,2,3,3,4,5,5 |
| Rank: | 1,1,3,3,5,5,7,8,8 |
| The final sort run after applying filtering predicate: | 1,1,2,2 |

As can be seen from the above example, less data needs to be processed at each merge pass because the filtering predicate that has been pushed down to the sort filters out rows that have ranks greater than the rank specified by the filtering predicate. The cost savings thus realized by pushing filtering predicates down into the window sort computation may be substantial in typical scenarios where window functions operate on massive datasets.

PARALLEL EXECUTION WITH PUSH-DOWN OPTIMIZATION

Push-down optimization may implemented when queries are executed in parallel. For the purpose of explanation, push-down optimization is described using the following TOP-N query:

SELECT x, y, RK
FROM (SELECT x, y
    RANK (Partition By x Order By y DESC) as RK
    FROM EmpTable)
Where RK<=3

The query is decomposed into its constituent parts, called row sources. Each row source corresponds to an operation that produces rows. Row sources may be connected to form a tree-like structure, which describes the execution plan of the above query.

Figure 7:
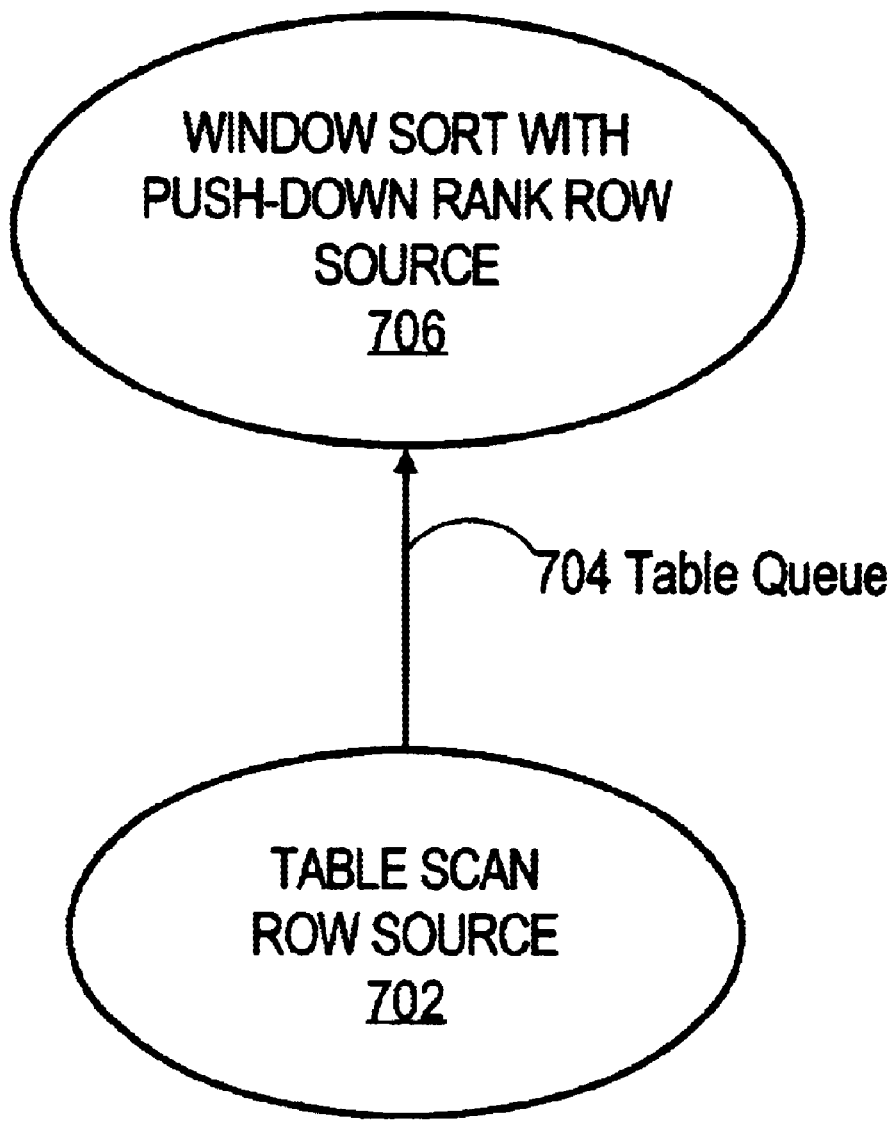
FIG. 7 illustrates a row source tree and DFO tree associated with the parallel execution of a TOP-N query.

FIG. 7 illustrates the row source tree 700 associated with the parallel execution of the above TOP-N query. For parallel execution of queries, row source tree is decomposed into a data-flow operator (DFO) tree. A DFO is a logical piece of query execution assigned to slave processes. A DFO can contain one or more row sources. Data transmission across DFOs (i.e., across slave processes) is done through Table Queues (TQ). TQs manage data flow for load distribution amongst slave processes. In FIG. 7, row sources grouped in ovals, represent DFOs 702, 706, which are associated with the parallel execution of the given Top-N query. In one embodiment, the pushdown optimization is implemented by pushing the filtering predicate into the window sort of the rank computation. DFO 702 scans rows of data (data items) from Emp table. Assuming the degree of parallelism to be 2, DFO 702 is assigned to slave processes S1 and S2, which perform the table scan while DFO 706 is assigned to slave processes S3 and S4, which perform the window sort computation. Assume that the data set upon which the above mentioned ranking function operates is shown below:

| EmpTable | |
|---|---|
| X | Y |
| 1 | 1 |
| 2 | 2 |
| 3 | 3 |
| 1 | 4 |
| 2 | 5 |
| 3 | 6 |
| 1 | 1 |
| 2 | 2 |
| 3 | 3 |
| 3 | 4 |
| 2 | 5 |
| 1 | 6 |
| 3 | 7 |
| 2 | 8 |
| 1 | 9 |

Slaves S1 and S2 each read subset of data items from the Emp Table and transmit them to slaves S3 and S4 via the table queue, TQ 704. TQ 704 partitions the data such that work load is evenly distributed across slaves S3 and S4. Assume that TQ affects hash partitioning on x and that x={1,3 } are assigned to slave process S3 while x={2} is assigned to slave process S4. Slave processes S3 and S4 perform the window sort operation on their respective partitions of data by pushing the filtering predicate on RANK into sort. The sorted and ranked data items associated with S3 and S4 may appear as follows:

| S3 | | | S4 | | |
|---|---|---|---|---|---|
| X | Y | rank | x | y | rank |
| 1 | 1 | 1 | 2 | 2 | 1 |
| 1 | 1 | 1 | 2 | 2 | 1 |
| 1 | 4 | 3 | 2 | 5 | 3 |
| 1 | 6 | 4 | 2 | 5 | 3 |
| 1 | 9 | 5 | 2 | 8 | 5 |
| 3 | 3 | 1 | | | |
| 3 | 3 | 1 | | | |
| 3 | 4 | 3 | | | |
| 3 | 6 | 4 | | | |
| 3 | 7 | 5 | | | |

After the data items in each partition are ranked, the filtering predicate RK<=3 is applied to the sorted data items to filter out data items with rank that is greater than 3. The filtered subsets of data items associated S3 and S4 may appear as follows:

| S3 | | | S4 | | |
|---|---|---|---|---|---|
| x | Y | rank | x | y | rank |
| 1 | 1 | 1 | 2 | 2 | 1 |
| 1 | 1 | 1 | 2 | 2 | 1 |
| 1 | 4 | 3 | 2 | 5 | 3 |
| 3 | 3 | 1 | 2 | 5 | 3 |
| 3 | 3 | 1 | | | |
| 3 | 4 | 3 | | | |

Thus, the result set corresponding to the above Top-N query is obtained by combining the result sets from slaves S3 and S4, and may appear as follows:

| x | y | Rank |
|---|---|---|
| 1 | 1 | 1 |
| 1 | 1 | 1 |
| 1 | 4 | 3 |
| 2 | 2 | 1 |
| 2 | 2 | 1 |
| 2 | 5 | 3 |
| 2 | 5 | 3 |
| 3 | 3 | 1 |
| 3 | 3 | 1 |
| 3 | 4 | 3 |

Note that in the above scheme, the entire data set needs to be transmitted through the table queue, TQ 704. In another embodiment, this communication cost between slaves {S1, S2 } and {S3, S4} is reduced drastically by pushing window sort computation to slaves S1 and S2. Slaves S1 and S2 not only scan their respective data set, but also rank them and filter unnecessary (rows not satisfying filtering predicate) rows. In this way, less data needs to be transmitted through the table queue thus reducing the time taken to evaluate the query.

To illustrate, the push-down optimization is described using the following TOP-N query and data set of EmpTable:
SELECT x, y, RK
FROM(SELECT x, y
  RANK (Partition By x Order By y DESC) as RK
  FROM EmpTable)
Where RK<=2

| EmpTable | |
|---|---|
| X | Y |
| 1 | 1 |
| 2 | 2 |
| 3 | 3 |
| 1 | 4 |
| 2 | 5 |
| 3 | 6 |
| 1 | 1 |
| 2 | 2 |
| 3 | 3 |
| 3 | 4 |
| 2 | 5 |
| 1 | 6 |
| 3 | 7 |
| 2 | 8 |
| 1 | 9 |

Figure 8:
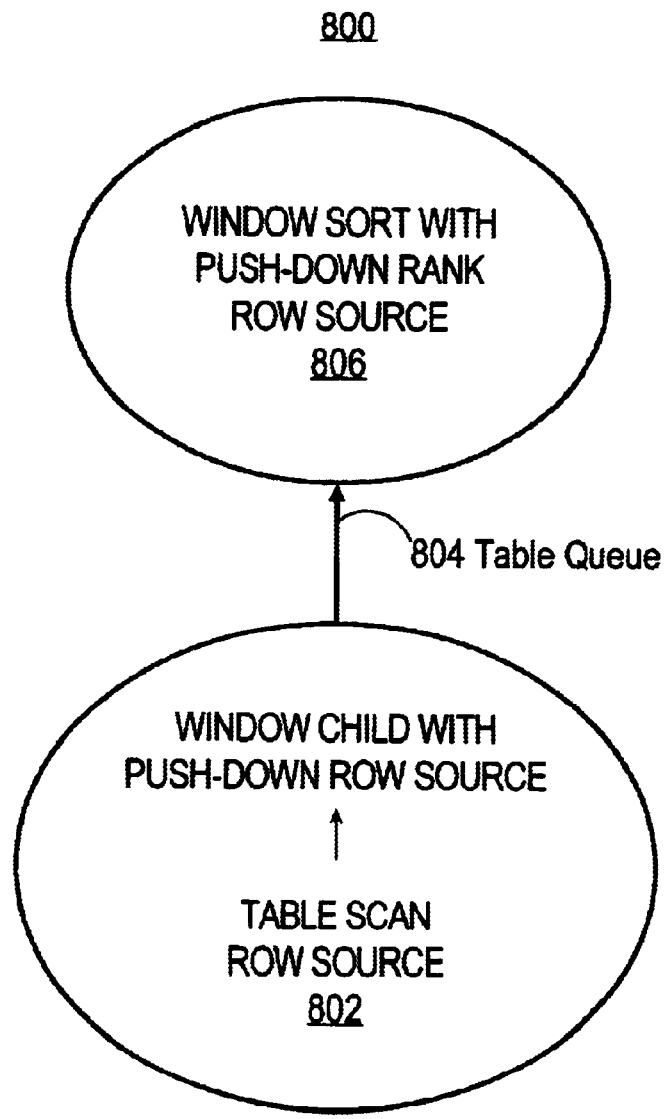
FIG. 8 illustrates the row source tree and DFO tree associated with the parallel execution of a TOP-N query.

FIG. 8 illustrates the row source and DFO tree associated with the parallel execution of the above Top-N query. FIG. 8 comprises DFO 802, DFO 806 and Table Queue TQ 804. Unlike the DFO tree of FIG. 7, DFO 802 contains a window sort row source with filtering predicate pushed in. This row source is referred to as window child to differentiate it from the window sort row source of DFO 806. Assuming the degree of parallelism to be 2, slaves S1 and S2 are assigned to DFO 802 while slaves S3 and S4 are assigned to DFO 806. The slave processes S1 and S2 perform table scan on Emp Table. In addition, they perform window child sort operation with the pushed down filtering predicate associated with "RANK (Partition By x Order By y DESC)". Assume that S1 is assigned to work on the first 8 data items of EmpTable, and that S2 is assigned the remaining data items of EmpTable. Thus, the sorted and ranked data items associated with S1, and S2 may appear as:

|   | S1 |      |   | S2 |      |
|---|----|------|---|----|------|
| x | y  | rank | x | y  | Rank |
| 1 | 1  | 1    | 1 | 6  | 1    |
| 1 | 1  | 1    | 1 | 9  | 2    |
| 1 | 4  | 3    | 2 | 5  | 1    |
| 2 | 2  | 1    | 2 | 8  | 2    |
| 2 | 2  | 1    | 3 | 3  | 1    |
| 2 | 5  | 3    | 3 | 4  | 2    |
| 3 | 3  | 1    | 3 | 7  | 3    |
| 3 | 6  | 2    |   |    |      |

By applying the filtering predicate RK<=2, which is associated with "RANK (Partition By x Order By y DESC)", only data item with rank greater than 2 are transferred up the DFO tree to the window sort with push-down rank DFO 806. Thus, the subsets of filtered data items associated with S1 and S2 that are to be transferred to DFO 806 may appear as follows:

|   | S1 |      |   | S2 |      |
|---|----|------|---|----|------|
| x | y  | rank | x | y  | Rank |
| 1 | 1  | 1    | 1 | 6  | 1    |
| 1 | 1  | 1    | 1 | 9  | 2    |
| 2 | 2  | 1    | 2 | 5  | 1    |
| 2 | 2  | 1    | 2 | 8  | 2    |
| 3 | 3  | 1    | 3 | 3  | 1    |
| 3 | 6  | 2    | 3 | 4  | 2    |

Before the sorted and filtered data is transferred to the window sort with push-down rank DFO 806, Table Queue 804 partitions the respective subset of data items of S1 and S2 in order to distribute the workload among slave processes S3, S4 at the window sort with push-down rank DFO 806. Assume that a hash partitioning is performed on x. Assume that x={1, 3} is assigned to slave process S3 and that x={2} is assigned to slave process S4. In the push-down optimization, slave processes S3 and S4 perform the window sort operation on their respective partitions of data by pushing the filtering predicate into "RANK (Partition By x Order By y DESC)". The sorted and ranked data items associated with S3 and S4 may appear as follows:

|   | S3 |      |   | S4 |      |
|---|----|------|---|----|------|
| x | y  | rank | x | y  | Rank |
| 1 | 1  | 1    | 2 | 2  | 1    |
| 1 | 1  | 1    | 2 | 2  | 1    |
| 1 | 6  | 3    | 2 | 5  | 3    |
| 1 | 9  | 4    | 2 | 8  | 4    |
| 3 | 3  | 1    |   |    |      |
| 3 | 3  | 1    |   |    |      |
| 3 | 4  | 3    |   |    |      |
| 3 | 6  | 4    |   |    |      |

After the data items in each partition are ranked, the filtering predicate RK<=2 is applied to the sorted data to filter out rows of data with rank that is greater than 2. The filtered data of S3 and S4 appear as:

|   | S3 |      |   | S4 |      |
|---|----|------|---|----|------|
| x | y  | rank | x | y  | Rank |
| 1 | 1  | 1    | 2 | 2  | 1    |
| 1 | 1  | 1    | 2 | 2  | 1    |
| 3 | 3  | 1    |   |    |      |
| 3 | 3  | 1    |   |    |      |

Thus, the result set corresponding to the above example TOP-N query is obtained by merging the filtered subsets of data items of S3 and S4 as follows:

| x | y | Rank |
|---|---|------|
| 1 | 1 | 1    |
| 2 | 2 | 1    |
| 2 | 2 | 1    |
| 3 | 3 | 1    |
| 3 | 3 |      |

HARDWARE OVERVIEW

Figure 9:
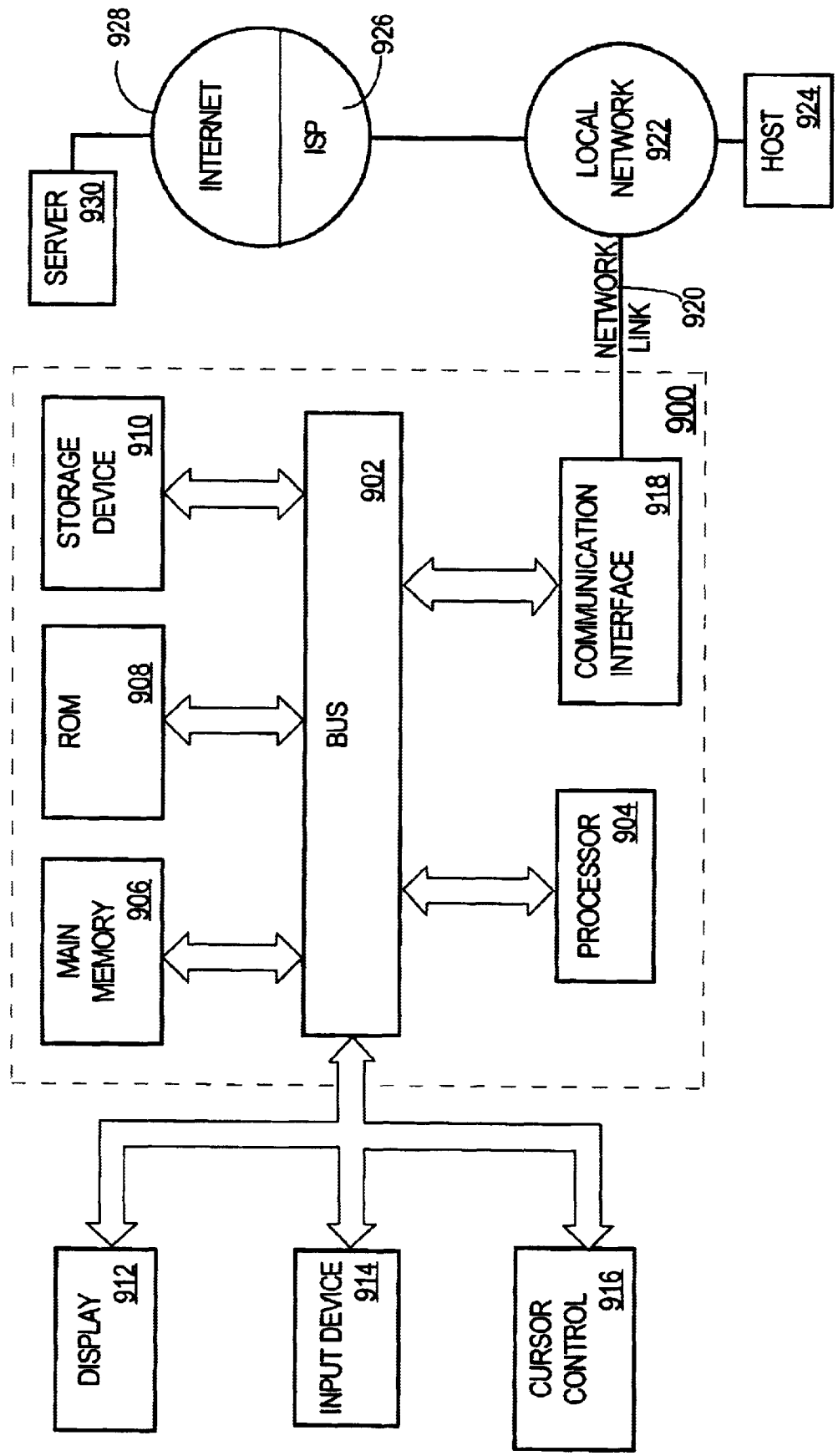
FIG. 9 depicts a computer upon which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are implemented by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application implements the techniques described herein.

The received code may be executed by processor 904 as it is received, and/or stored in storage device 910, or other non-volatile storage for later execution. In this manner, computer system 900 may obtain application code in the form of a carrier wave.

SCOPE

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for execution of a query containing a set of one or more window functions, the method comprising the computer implemented steps of: for each subset of a plurality of subsets of data items:
   ranking, based on a target ranking function, data items within the subset relative to other data items within the subset; and
   filtering, based on a filtering predicate that is associated with the target ranking function, data items from the subset;
   wherein the target ranking function is in the set of one or more window functions.

2. The method of claim 1, further comprising the step of selecting the target ranking function from a plurality of ranking functions in the set of one or more window functions.

3. The method of claim 2, wherein the step of selecting the target ranking function comprises the steps of:
   determining that there is at least one predicate appearing in an outer query block associated with a ranking function in the set of window functions;
   selecting as the filtering predicate a first-to-appear predicate appearing in the outer query block; and
   selecting as the target ranking function the ranking function corresponding to the filtering predicate.

4. The method of claim 2, wherein the step of selecting the target ranking function comprises the steps of:
   determining that there is at least one predicate appearing in an outer query block associated with a ranking function in the set of window functions;
   selecting as the filtering predicate a most restrictive predicate appearing in the outer query block, wherein the most restrictive predicate filters out the most amount of data items in response to a window sort operation corresponding to the target ranking function; and selecting as the target ranking function the ranking function corresponding to the filtering predicate.

5. The method of claim 1, further comprising the steps of:
determining whether all the window functions in the set of one or more window functions belong to a same ordering group;
determining whether the set of one or more window functions satisfy a predetermined set of push-down criteria when all the window functions in the set of one or more window functions belong to the same ordering group; and
computing a window sort operation corresponding to the target ranking function after computing all other window functions in the set of one or more window functions when not all the window functions in the set of one or more window functions belong to the same ordering group.

6. The method of claim 5, further comprising the steps of:
determining whether any subset of one or more window functions in the set of one or more window functions belong to the same ordering group as that of the target ranking function when not all the window functions in the set of one or more window functions belong to the same ordering group; and
determining whether the subset of one or more window functions satisfy the predetermined set of push-down criteria when there is a subset of one or more window functions in the set of one or more window functions that belong to the same ordering group as that of the target ranking function.

7. The method of claim 6, wherein the predetermined set of push-down criteria comprises:
the filtering predicate is of a form "P<relational operator><constant>", wherein the relational operator is from the set {<,<=,=}, and wherein P is rank;
a granularity of a Partition By clause of each unordered window function in the set of one or more window functions, and which is the same ordering group as the target ranking function is at least of equal granularity as a granularity of a concatenation of a Partition By clause and an Order By clause of the target ranking function;
a granularity of a Partition By clause of each ranking function in the set of one or more window functions, and which is in the same ordering group as the target ranking function is at least of equal granularity as the granularity of the Partition By clause of the target ranking function, and for each ranking function Partition By clause of equal granularity as the granularity of the Partition By clause of the target ranking function, a granularity of an Order By clause of the ranking function is at least of equal granularity as the granularity of the Order By clause of the target ranking function;
a granularity of a Partition By clause of each ordered window function with ROWS option in the set of one or more window functions, and which is in the same ordering group as the target ranking function is at least of equal granularity as the granularity of the Partition By clause of the target ranking function; and
a granularity of a Partition By clause of each ordered window function with RANGE option in the set of one or more window functions, and which is in the same ordering group as the target ranking function is at least of equal granularity as the granularity of the concatenation of the Partition By clause and the Order By clause of the target ranking function.

8. The method of claim 7, wherein the ROWS option includes N rows preceding a current row of operation.

9. The method of claim 7, wherein the RANGE option includes N rows preceding a current row of operation.

10. The method of claim 1, wherein the step of ranking data items within the subset includes:
assigning the subset to a parallel process of a plurality of parallel processes; and
causing the parallel process to rank the data items within the assigned subset.

11. The method of claim 1, wherein the step of filtering data items is performed by the parallel process on data items within the assigned subset.

12. The method of claim 1, wherein the steps of ranking and filtering the data items are performed by a single process and include:
reading, sorting, ranking, and filtering data items that are within the subset; and
storing data items that are within the subset after filtering, is performed.

13. The method of claim 7, further comprising the steps of:
converting the filtering predicate to the form "P<= <constant>" before computing the window sort operation corresponding to the target ranking function when the relational operator is {=}; and
converting the filtering predicate back to the form "P=<constant>" in a final step in the window sort operation.

14. A computer-readable medium bearing instructions for execution of a query containing a set of one or more window functions, the computer-readable medium comprising instructions for performing the steps:
for each subset of a plurality of subsets of data items:
ranking, based on a target ranking functions, data items within the subset relative to other data items within the subset; and
filtering, based on a filtering predicate that is associated with the target ranking function, data items from the subset;
wherein the target ranking function is in the set of one or more window functions.

15. The computer-readable medium of claim 14, further comprising the step of selecting the target ranking function from a plurality of ranking functions in the set of one or more window functions.

16. The computer-readable medium of claim 15, wherein the step of selecting the target ranking function comprises the steps of:
determining that there is at least one predicate appearing in an outer query block associated with a ranking function in the set of window functions;
selecting as the filtering predicate a first-to-appear predicate appearing in the outer query block; and
selecting as the target ranking function the ranking function corresponding to the filtering predicate.

17. The computer-readable medium of claim 15, wherein the step of selecting the target ranking function comprises the steps of:
determining that there is at least one predicate appearing in an outer query block associated with a ranking function in the set of window functions;
selecting as the filtering predicate a most restrictive predicate appearing in the outer query block, wherein the most restrictive predicate filters out the most amount of data items in response to a window sort operation corresponding to the target ranking function; and selecting as the target ranking function the ranking function corresponding to the filtering predicate.

18. The computer-readable medium of claim 14, further comprising the steps of:

determining whether all the window functions in the set of one or more window functions belong to a same ordering group;

determining whether the set of one or more window functions satisfy a predetermined set of push-down criteria when all the window functions in the set of one or more window functions belong to the same ordering group; and computing a window sort operation corresponding to the target ranking function after computing all other window functions in the set of one or more window functions when not all the window functions in the set of one or more window functions belong to the same ordering group.

19. The computer-readable medium of claim 18, further comprising the steps of:

determining whether any subset of one or more window functions in the set of one or more window functions belong to the same ordering group as that of the target ranking function when not all the window functions in the set of one or more window functions belong to the same ordering group; and determining whether the subset of one or more window functions satisfy the predetermined set of push-down criteria when there is a subset of one or more window functions in the set of one or more window functions that belong to the same ordering group as that of the target ranking function.

20. The computer-readable medium of claim 19, wherein the predetermined set of push-down criteria comprises:

the filtering predicate is of a form "P<relational operator><constant>", wherein the relational operator is from the set {<,<=,=}, and wherein P is rank;

a granularity of a Partition By clause of each unordered window function in the set of one or more window functions, and which is the same ordering group as the target ranking function is at least of equal granularity as a granularity of a concatenation of a Partition By clause and an Order By clause of the target ranking function;

a granularity of a Partition By clause of each ranking function in the set of one or more window functions, and which is in the same ordering group as the target ranking function is at least of equal granularity as the granularity of the Partition By clause of the target ranking function, and for each ranking function Partition By clause of equal granularity as the granularity of the Partition By clause of the target ranking function, a granularity of an Order By clause of the ranking function is at least of equal granularity as the granularity of the Order By clause of the target ranking function;

a granularity of a Partition By clause of each ordered window function with ROWS option in the set of one or more window functions, and which is in the same ordering group as the target ranking function is at least of equal granularity as the granularity of the Partition By clause of the target ranking function; and a granularity of a Partition By clause of each ordered window function with RANGE option in the set of one or more window functions, and which is in the same ordering group as the target ranking function is at least of equal granularity as the granularity of the concatenation of the Partition By clause and the Order By clause of the target ranking function.

21. The computer-readable medium of claim 20, wherein the ROWS option includes N rows preceding a current row of operation.

22. The computer-readable medium of claim 20, wherein the RANGE option includes N rows preceding a current row of operation.

23. The computer-readable medium of claim 14, wherein the step of ranking data items within the subset includes:

assigning the subset to a parallel process of a plurality of parallel processes; and causing the parallel process to rank the data items within the assigned subset.

24. The computer-readable medium of claim 14, wherein the step of filtering data items is performed by the parallel process on data items within the assigned subset.

25. The computer-readable medium of claim 14, wherein the steps of ranking and filtering the data items are performed by a single process and include:

reading, sorting, ranking and filtering data items that are within the subset;

storing data items that are within the subset after filtering is performed.

26. The computer-readable medium of claim 20, further comprising the steps of:

converting the filtering predicate to the form "P<= <constant>" before computing the window sort operation corresponding to the target ranking function when the relational operator is {=}; and converting the filtering predicate back to the form "P=<constant>" in a final step in the window sort operation.

* * * * *